(12) United States Patent
Inoue et al.

(10) Patent No.: US 7,389,150 B2
(45) Date of Patent: Jun. 17, 2008

(54) DISPLAY SYSTEM FOR CONTROLLER (75) Inventors: Shogo Inoue, Yamanashi (JP);
Norinaga Mutai, Yamanashi (JP);
Kunio Tanaka, Akishima (JP)

(73) Assignee: Fanuc Ltd, Yamanashi (JP)

( * ) Notice: Subject to any disclaimer, the term of this patent is extended or adjusted under 35 U.S.C. 154(b) by 60 days.

(21) Appl. No.: 11/278,435

(22) Filed: Apr. 3, 2006

(65) Prior Publication Data
US 2006/0224256 A1 Oct. 5, 2006

(30) Foreign Application Priority Data
Apr. 1, 2005 (JP) ............................. 2005-106254

(51) Int. Cl.
*G05B 11/01* (2006.01)
(52) U.S. Cl. ................. 700/17; 700/15; 700/83
(58) Field of Classification Search ........... 700/15, 700/17, 83, 180
See application file for complete search history.

(56) References Cited

U.S. PATENT DOCUMENTS

| | | | | |
|---|---|---|---|---|
| 4,396,977 A | * | 8/1983 | Slater et al. ................. | 700/83 |
| 5,426,421 A | * | 6/1995 | Gray ........................ | 709/223 |
| 5,844,693 A | * | 12/1998 | Miyata ...................... | 358/448 |
| 5,982,362 A | | 11/1999 | Crater et al. | |
| 7,020,881 B2 | * | 3/2006 | Takahashi et al. .......... | 719/322 |
| 7,103,428 B2 | * | 9/2006 | Varone et al. ............... | 700/83 |
| 7,158,845 B2 | * | 1/2007 | Parsons et al. .............. | 700/96 |
| 2004/0015268 A1 | * | 1/2004 | Kato et al. .................. | 700/275 |

FOREIGN PATENT DOCUMENTS

| | | |
|---|---|---|
| DE | 101 54 534 A1 | 6/2002 |
| EP | 0 501 901 A | 9/1992 |
| EP | 1 372 051 A | 12/2003 |
| JP | 2-053106 | 2/1990 |
| JP | 2002-111680 | 4/2002 |
| JP | 2003-005812 | 1/2003 |

OTHER PUBLICATIONS

European Search Report, dated Aug. 11, 2006, for related European Patent Application No. EP 06 25 1448.

* cited by examiner

*Primary Examiner*—Alexander J Kosowski
(74) *Attorney, Agent, or Firm*—Staas & Halsey LLP (57) ABSTRACT A controller and a display device are connected to each other by a network. The controller comprises a network control program which controls a network control section to communicate with the display device for each of a plurality of operation modes, including an initialization mode, a normal action mode, and an alarm mode. Various data, such as operation mode information for the controller, are transmitted to the display device connected by the network through the network control section and display data is displayed on the display device.

8 Claims, 9 Drawing Sheets

STATUS DATA:

| SOURCE ADDRESS PORTION | DESTINATION ADDRESS PORTION | OPERATION MODE PORTION | CONTROLLER INFORMATION PORTION | COMMUNICATION INFORMATION PORTION |

| Node | Name | Com | Status |
|---|---|---|---|
| 0 | 192.168.1.10 (NC-00E0E4123456 | 0001 | 0001 |
| 1 | 192.168.1.11 (NC-00E0E4121212 | 0001 | 0004 |
| 2 | | | |
| 3 | 192.168.1.13 (NC-00E0E4343434 | 0000 | ... |
| 4 | 192.168.1.14 (NC-00E0E4232323 | 0001 | 8001 |
| 5 | | | |
| 6 | | | |
| 7 | | | |

DISPLAY SYSTEM FOR CONTROLLER

BACKGROUND OF THE INVENTION

1. Field of the Invention

The present invention relates to a display system for a controller for controlling a machine, in which a display device and the controller are connected to each other by a network.

2. Description of the Related Art

Already known is a system in which a controller for controlling a machine tool or the like and a personal computer used as a display device are connected to each other by a network. For example, there is a system (see Japanese Patent Application Laid-Open No. 2003-5812) in which screen data to be displayed on a display device of a numerical controller can be displayed on a screen of a personal computer that is connected by a network. In another known system (see Japanese Patent Application Laid-Open No. 2-53106), a numerical controller and a computer are connected to each other by a network so that the computer can monitor a display screen of the numerical controller without the use of a display control section.

Also known is a system (Japanese Patent Application Laid-Open No. 2002-111680) in which a controller, a display device for controller, and a host device are connected to one another by a network. In this system, the display device for controller makes a conversion between a data representation format in a data column transferred by communication between the host device and itself and a data representation format in a data column transferred by communication between the controller and itself, thereby relaying the communication between the controller and the host device.

According to the conventional system in which the controller and the display device are connected by the network, display data of the controller can be displayed only during normal operation in which the controller is normally initialized and a communication function is performed. Therefore, the display data cannot be displayed at the time of initialization of the controller or in case of system alarm.

If the network conditions are poor, although the controller is in the normal operation, moreover, error detection with a normal communication time-out function for the communication function is time-consuming, and a function to check the communication status is unsatisfactory. Accordingly, it takes time to be allowed to conclude that the display device is not operating correctly. Thus, maintenance work to cover malfunction of the controller or solve network problems requires a separate display device that is connected by video signals or the like.

SUMMARY OF THE INVENTION

The object of the present invention is to provide a display system for a controller in which the controller and a display device are connected to each other by a network. The controller comprises a network control program which controls a network control section to communicate with the display device for each of a plurality of operation modes. Various data are transmitted to the display device connected by the network through the network control section and display data is displayed on the display device.

The operation modes may include an initialization mode, a normal action mode, and an alarm mode.

The various data may include operation mode information for the controller, and the display device may be configured to start a display screen to display the display data thereon in accordance with the operation mode information.

The display device may comprise display control programs corresponding to the operation modes of the controller so that the corresponding display control programs can be executed in accordance with the operation mode information from the controller and that each corresponding display screen can be displayed on a display section.

The display device may be configured to display an alarm on the display screen when no operation mode information can be received from the controller.

The display device may have transmission means configured to transmit operation mode information for the display device, which indicates that a display control program corresponding to the operation mode of the controller is running, to the controller, and the controller may have display means for displaying reception of the information from the transmission means. Further, the controller may have stop means configured to stop the controller when the operation mode information from the display device ceases to be able to be received.

Two or more controllers and one display device may be connected to the network, and the display device may be configured to display the display data of the controllers simultaneously or after changing a display screen.

The display system may further comprise a communication processor for controlling a communication function, as well as a processor for controlling each operation mode of the controller.

According to the present invention, the network control program is provided for each operation mode so that the various data of the controller can be sent to the display device to be displayed thereon. Thus, the data of the controller can be displayed in any of the operation modes including the other operation modes than the normal action mode.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
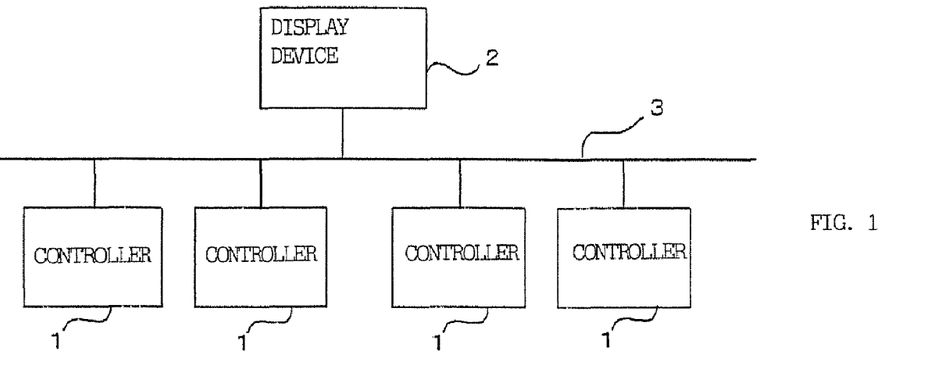
FIG. 1 is a diagram of a display system according to one embodiment of the invention.

FIG. 1 is diagram of a display system according to one embodiment of the present invention, showing an example in which numerical controllers are used as control devices that constitute the display system. In this display system, a plurality of numerical controllers 1 that perform communication are connected to a display device (or personal computer) 2 for the display of respective display screens of the numerical controllers 1 by a network (Ethernet: trademark) 3.

Figure 2:
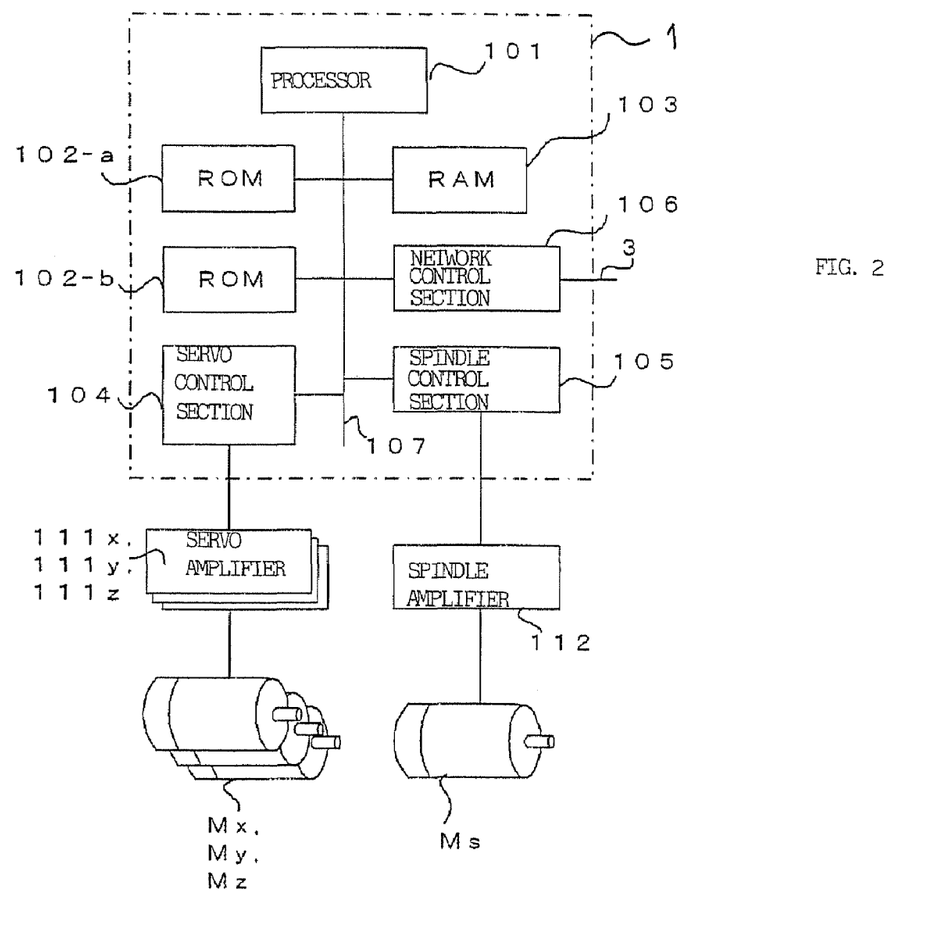
FIG. 2 is a block diagram showing principal parts of a controller (numerical controller), which constitutes the display system of FIG. 1, and principal parts of a machine tool controlled by the numerical controller.

FIG. 2 is a block diagram showing principal parts of the numerical controller 1 that constitutes the display system of FIG. 1 and principal parts of a machine tool controlled by the numerical controller 1.

The numerical controller 1 comprises a processor 101, flash ROMs 102-a and 102-b, RAM 103, servo control section 104, spindle control section 105, network control section 106, etc. The elements 102 to 106 are connected to the processor 101 by a bus 107. The processor 101 reads out system programs stored in the flash ROM 102-a or 102-b and generally controls the numerical controller 1 in accordance with these system programs. The RAM 103 is loaded with temporary calculation data. The servo control section 104 is composed of a processor and memories, such as a ROM, RAM, etc. Based on machining programs, it receives move commands for individual feed axes (rectangular X-axis, Y-axis, and Z-axis in this embodiment) that are delivered from the processor 101 of the numerical controller 1, and drives servomotors Mx, My and Mz for the individual axes with the aid of servo amplifiers 111x, 111y and 111z for the individual axes.

The respective basic configurations of the numerical controller 1 and the machine tool differ from that of a conventional numerical controller only in that the numerical controller 1 is provided with or requires neither a display control section, nor a display unit, nor a keyboard. However, the numerical controller 1 shown in FIGS. 1 and 2 is provided with the network control section 106, and the screen of the numerical controller 1 can be displayed on the display device 2 that connected thereto by the network 3.

Although the two flash ROMs 102-a and 102-b are prepared in this embodiment, both of them need not be provided only if system programs (mentioned later) can be stored independently. A hard disc or some other storage device with a larger capacity may be used as the one flash ROM 102-b.

Figure 3:
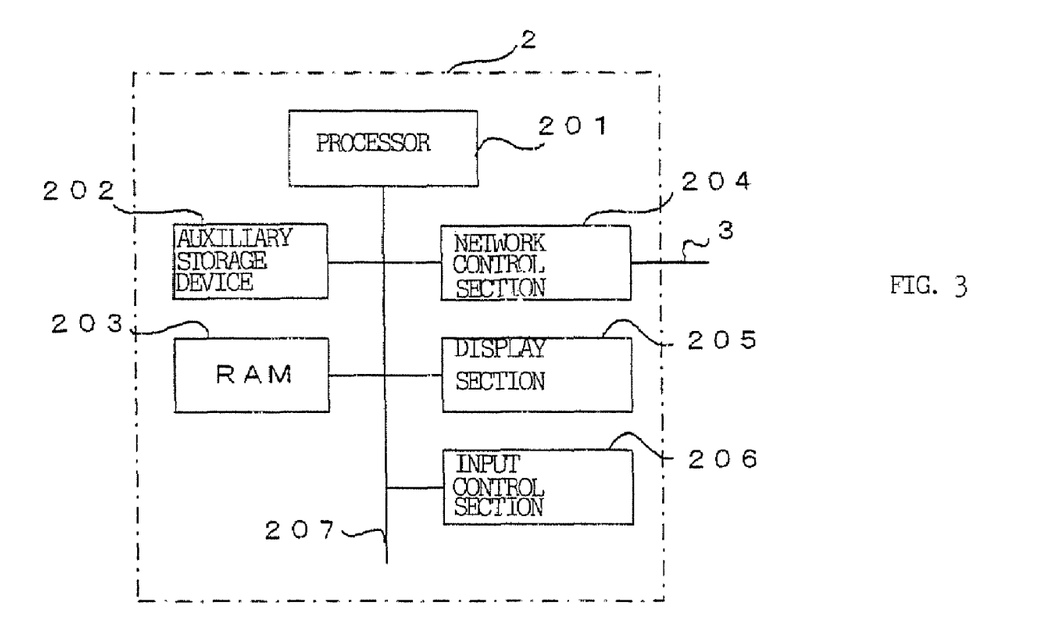
FIG. 3 is a block diagram showing principal parts of a display device of FIG. 1.

FIG. 3 is a block diagram showing principal parts of the display device 2 of FIG. 1. The display device 2 comprises a processor 201, auxiliary storage device 202 such as a hard disc, RAM 203, network control section 204, display section 205 formed of a CRT or liquid crystal, and an input control section 206 such as a keyboard or mouse. The elements 202 to 206 are connected to the processor 201 by a bus 207. The processor 201 reads out system programs stored in the auxiliary storage device 202 and operates the display device 2 in accordance with these system programs. The RAM 203 is used as a working memory for this operation.

A conventional personal computer having a network function or the like may be used as the display device 2.

Figure 4:
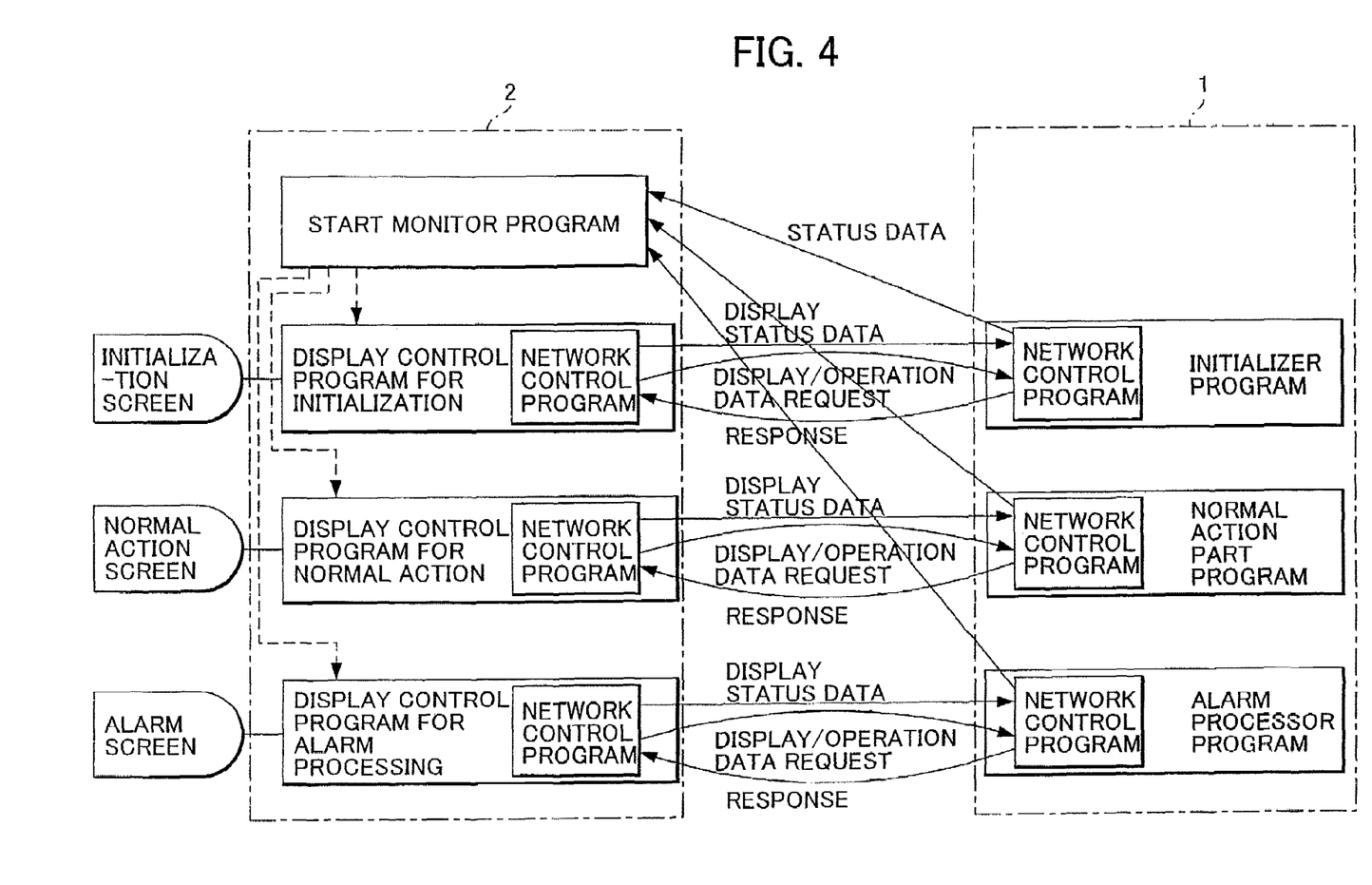
FIG. 4 is a block diagram illustrating relationships between system programs in the numerical controller of FIG. 3 and system programs in the display device of FIG. 1.

FIG. 4 is a block diagram illustrating relationships between the system programs in the numerical controller 1 and the system programs in the display device 2.

The system programs in the numerical controller 1 are divided for each operation mode and stored independently. In this embodiment, individual system programs, including an initializer program, normal action part program, and alarm processor program, are stored independently. The initializer program is mounted in the flash ROM 102-a, while the normal action part program and the alarm processor program are independently mounted in the flash ROM 102-b. Further, the initializer program, normal action part program, and alarm processor program each include a network control program for operating the network control section 106.

The system programs in the display device 2 are divided into system programs including a display control program for initialization, display control program for normal action, and display control program for alarm processing, corresponding individually to the initializer program, normal action part program, and alarm processor program of the numerical controller 1. The display control programs provided in this embodiment are as many as the numerical controllers 1 that are connected to the network 3. A display screen of each display control program is displayed on the display section 205. Further, each display control program includes a network control program for operating the network control section 204. Furthermore, the display device 2 has its auxiliary storage device 202 loaded with a start monitor program for controlling the initiation of the three system programs (display control programs for initialization, normal action, and alarm processing).

When the numerical controller 1 is switched on, the initializer program performs processing to load the RAM 103 with the normal action part program and the alarm processor program.

The normal action part program performs necessary normal action for machining including control of the individual servomotors based on the machining programs. This normal action part program is designed so that error processing can be appropriately performed to deal with most of errors if any problem is aroused as an operator carries out operation under wrong set conditions or wrong operation. In rare cases, however, an unexpected error may be generated in one of the system programs to hinder correct execution of the normal action part program. In these cases, the processor 101 detects the error, and alarm processor program is executed instead of normal action part program.

The alarm processor program analyzes the status of the processor 101 and the contents of the RAM 103, thereby investigating the cause of malfunction of the normal action part program, and removes the cause.

Further, the normal action part program must be periodically replaced with an up-to-date one in order to add functions or improve performance. If the substitute normal action part program is defective, the defect may possibly have been caused by the replacement of the normal action part program. Since the initializer program is distinguished from the normal action part program, in this case, the initializer program can be executed by rebooting the numerical controller 1 so that the shunted original normal action part program can be restored.

The initializer program, normal action part program, and alarm processor program of the numerical controller 1 require the operator's operation and processing content check.

Thus, the initializer program requires operations for displaying the status of initialization related to the hardware of the numerical controller 1, displaying the kind of the loaded normal action part program, and inputting and outputting the system programs as required. The normal action part program requires normal operation for actuating the numerical controller to perform machining and display of machining conditions. The alarm processor program requires recognition of the status of the main processor 101 and display of the contents of the main RAM 103 in order to examine problems of the normal action part program and check the hardware.

In this embodiment, these display/operation processes are performed by the display device 2 that is connected to the network through the network control section 106. Thus, the initializer program, normal action part program, and alarm processor program each include the network control program for operating the network control section. While any of the programs is running, processes for transmitting status data for an operation mode and required display data to the display device 2 are performed at regular time intervals based on the network control program concerned.

The following is a description of operation according to this embodiment.

Figure 5:
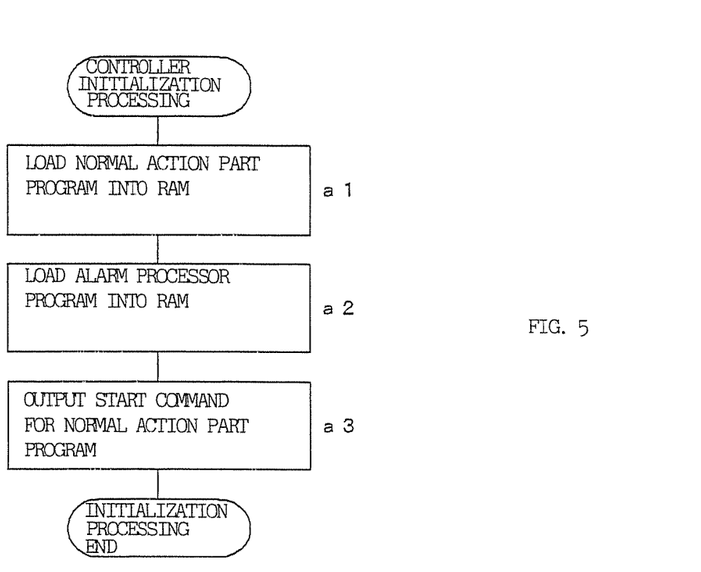
FIG. 5 is a flowchart showing initialization processing of the numerical controller of FIG. 1.

FIG. 5 is a flowchart showing initialization processing of the numerical controller 1.

When the power is turned on, the processor 101 of the numerical controller 1 actuates the initializer program of the flash ROM 102-*a*, thereby executing the initialization processing of the numerical controller 1 shown in the flowchart of FIG. 5 (initialization mode).

First, the normal action part program stored in the flash ROM 102-*b* is read out and written to the RAM 103 (Step a1). Then, the alarm processor program is read out and written to the RAM 103 (Step a2). Thereafter, a command for jump to the normal action part program is outputted, whereupon the operation mode of the system program is switched from the initialization mode over to the normal action part program (Step a3).

While the initializer program, normal action part program, or alarm processor program is running, the network control program in the program concerned delivers status data at regular time intervals.

Figure 6:
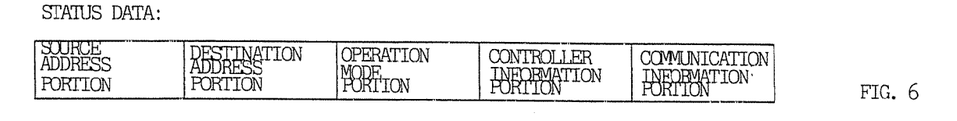
FIG. 6 is a diagram showing contents of status data periodically delivered from the numerical controller of FIG. 1 at regular time intervals.

FIG. 6 is a diagram showing the contents of the status data that are periodically delivered at regular time intervals. Each status data is composed of a format including a source address portion, destination address portion, operation mode portion, controller information portion, and communication information portion.

The source address portion indicates an address of the numerical controller 1 itself on the network, while the destination address portion indicates an address of the display device 2 on the network. During the execution of the initializer program, moreover, the operation mode portion is loaded with the "initialization mode," and besides, a detailed operation status. The controller information portion is loaded with information proper to the numerical controller 1, such as its basic configuration. The communication information portion is loaded with information on a communication status, such as the number of communication errors detected by the network control program of the numerical controller 1.

When the initialization is finished after the jump to the normal action part program in Step a3 (FIG. 5) for the initializer program, the normal action part program is executed. As this is done, the network control program in the normal action part program is executed, and the status data in the aforesaid same format are delivered periodically. The content of the operation mode portion that constitutes the status data is a "normal action mode." If an error occurs owing to incorrect execution of the normal action part program, the program jumps to the alarm processor program, whereupon the alarm processor program is executed. The status data in the aforesaid same format are delivered periodically by the network control program in the alarm processor program. In this case, the content of the operation mode portion is an "alarm mode." Thus, the operation mode in which the numerical controller 1 is currently operating can be determined.

Figure 7:
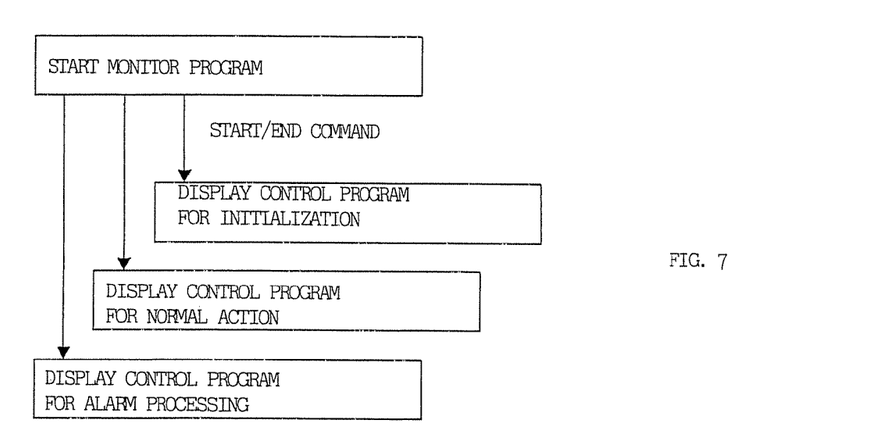
FIG. 7 is a diagram showing how a display control mode of the display device of FIG. 1 is switched.

FIG. 7 is a diagram showing how a display control mode of the display device 2 is switched. The start monitor program of the display device 2 starts the display control program for initialization, normal action, or alarm processing for the numerical controller 1 corresponding to its operation mode, based on the status data periodically delivered from the network control program in the initializer program, normal action part program, or alarm processor program of the numerical controller 1.

As shown in FIG. 4, the started display control program transmits, as request data, necessary data for the display of the display screen corresponding to the operation mode concerned, to the processor program of the corresponding operation mode in the numerical controller 1. In consequence, display data corresponding to the request data is received from the numerical controller 1. If the display screen displayed on the display device 2 is operated, operation data is transmitted to the numerical controller 1. Thereupon, operation data corresponding to the transmitted data (i.e., receive data indicative of execution of processing corresponding to the operation) is received from the numerical controller 1.

Since the numerical controller 1 and the display device 2 perform communication through the network 3 by the procedure described above, they need not always simultaneously start the communication from the initialization mode. If the numerical controller 1 singly advances the operation and is connected with the display device 2 as required, a display screen that matches the then operation mode of the numerical controller can be displayed on the display device 2 and operated.

Figure 8:
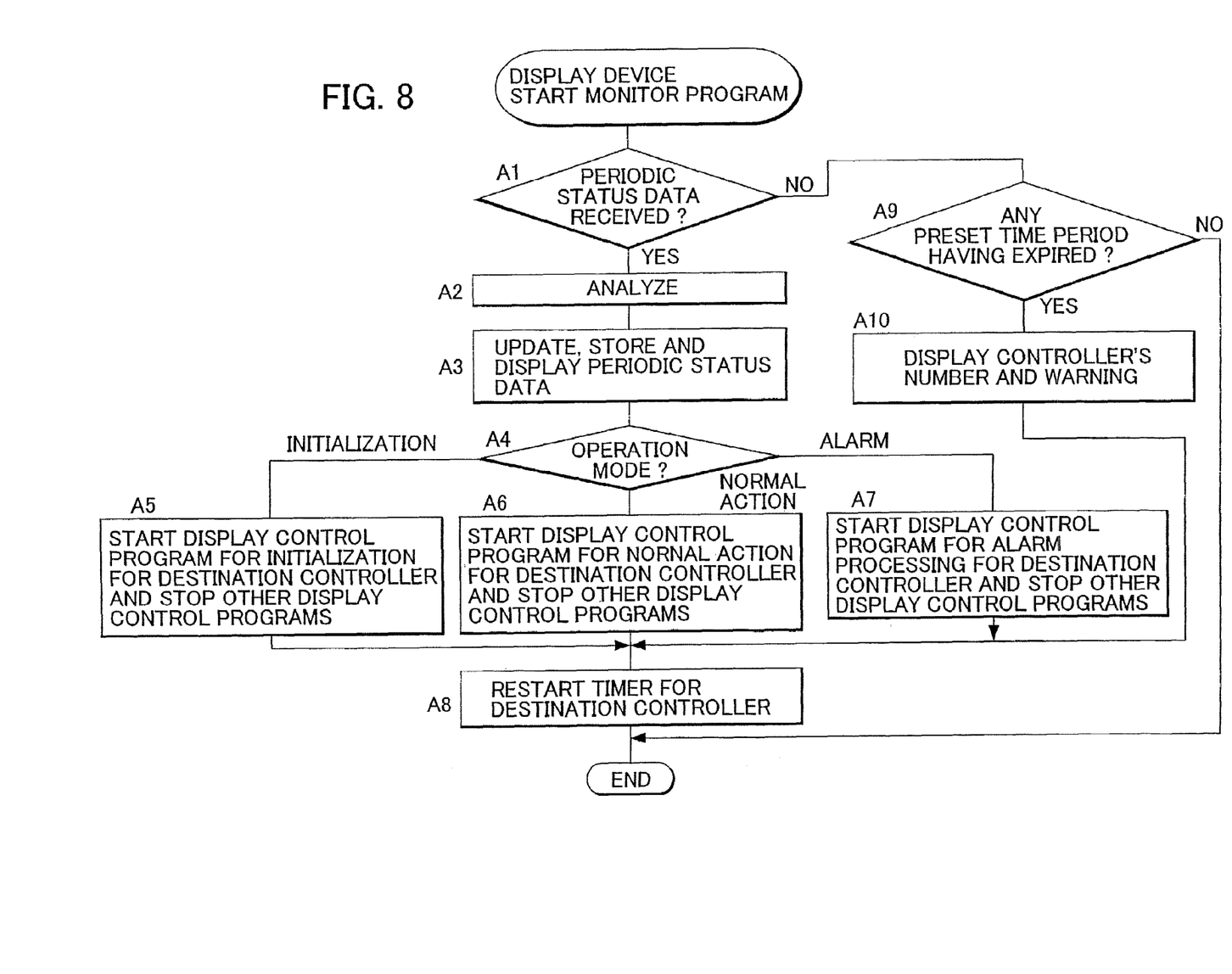
FIG. 8 is a process flowchart showing a start monitor program the display device of FIG. 1 executes for each given period.

FIG. 8 is a process flowchart showing the start monitor program the display device 2 executes for each given period.

When the display device 2 is switched on, the start monitor program is executed. The processor 201 first determines whether or not the status data periodically transmitted from each numerical controller 1 is received and whether a preset time period for each numerical controller 1 has expired or not (Steps A1 and A9). Each timer is set so as to measure a time period a little longer than each of the time intervals at which the status data are delivered, and the measured time value is initialized when the power is turned on. If no status data is received and if a preset time period has not expired, the processing for the present period is finished at once.

If the display device 2 receives the status data in the format shown in FIG. 6 delivered from numerical controller 1, on the other hand, the display device 2 analyzes the received status data, updates and stores its content, and displays it on the screen of the display section 205 (Steps A2 and A3).

Figure 9:
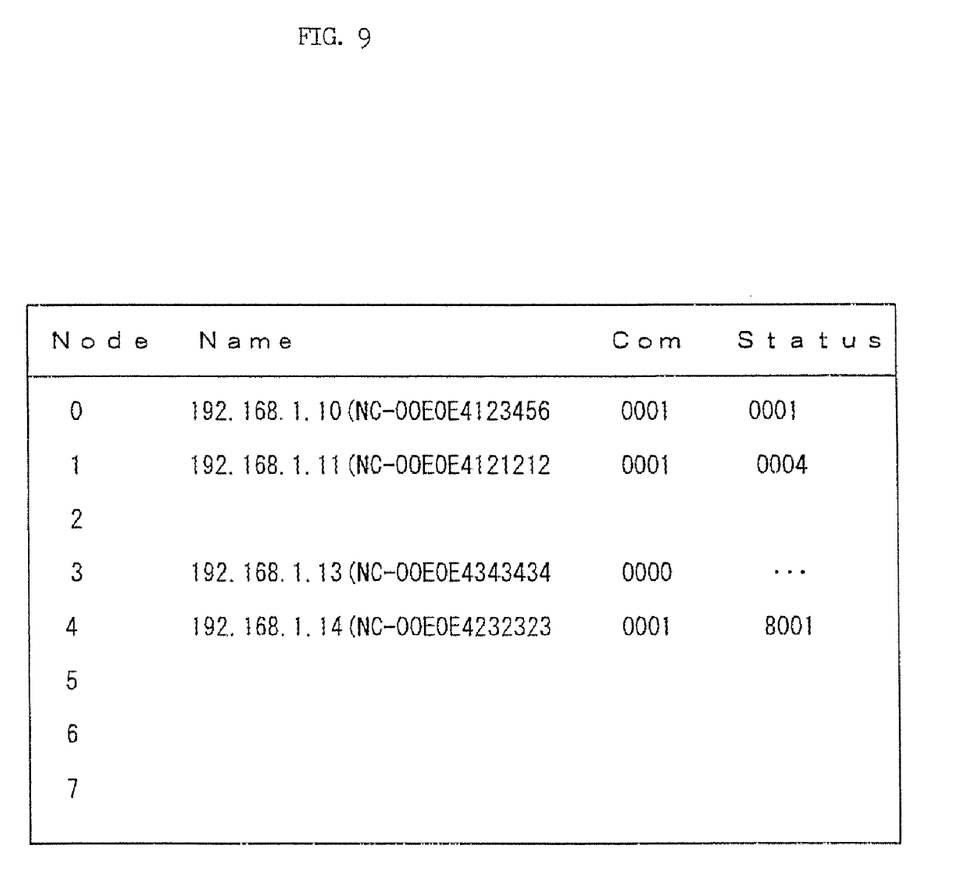
FIG. 9 is a diagram showing an example of a screen of the display device on which the status data delivered from the numerical controller of FIG. 1 are listed.

FIG. 9 is a diagram showing an example of a screen on which the status data are listed.

In FIG. 9, "Node", "Name", "Com", and "Status" are data that represent the number of the numerical controller indicated by the source address portion of the status data, the name of the numerical controller indicated by the controller information portion of the status data, the communication status indicated by the communication information portion of the status data, and the operation status indicated by the operation mode portion of the status data, respectively.

Then, the operation mode portion of the status data determines whether the operation status of the numerical controller indicates the execution of initializer program, normal action part program, or alarm processor program (Step A4). If it is then concluded that the initializer program is running, the display control program for initialization corresponding to the numerical controller indicated by the source address portion is started, and stop commands are outputted to the other display control programs (Step A5). If it is concluded that the normal action part program is running, on the other hand, the display control program for normal action corresponding to the numerical controller indicated by the source address portion is started, and stop commands are outputted to the other display control programs (Step A6). If it is concluded that the alarm processor program is running, moreover, the display control program for alarm processing corresponding to the numerical controller indicated by the source address portion is started, and stop commands are outputted to the other display control programs (Step A7).

A timer corresponding to the numerical controller having received the status data is reset to restart time measurement (Step A8), whereupon the processing for the present period is finished.

If the preset time period has expired without receiving any status data (Step A9), on the other hand, a warning, as well as the number and name of the numerical controller corresponding to the preset time period expired, is displayed on the screen of the display section 205 (Step A10), whereupon the program proceeds to Step A8.

Thus, the display device 2 periodically receives the status data from each numerical controller 1 through the network, updates and stores the received status data, and displays it on the display section 205. Further, the display control program is started in accordance with the operation mode of each numerical controller 1. Since the status data is sent for each fixed period, the display device 2 can always grasp the operation status (operation mode) of the numerical controller connected to the network.

Figure 10:
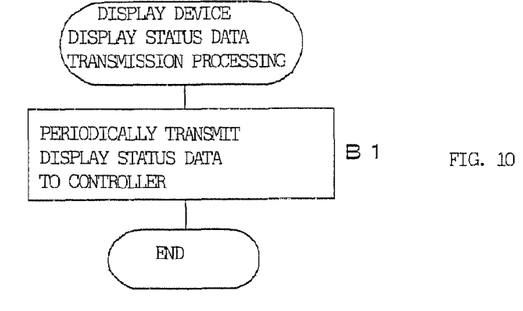
FIG. 10 is a flowchart showing display status data transmission processing executed by the display device of FIG. 1.

As shown in FIG. 10, on the other hand, each started display control program periodically delivers display status data to the numerical controller 1 (Step B1). The content of the display status data periodically delivered from the display device 2 to the numerical controller 1 is substantially the same as the one shown in FIG. 6. More specifically, a source address portion of the display status data indicates an address of the display device 2 on the network. A destination address portion indicates an address of the numerical controller 1 on the network. The value of a source address portion in periodic delivery data delivered from the numerical controller 1 is used for this address. An operation mode portion is loaded with an operation mode of the display device 2, and besides, a detailed operation status. A device information portion is loaded with information proper to the display device 2, such as its basic configuration. A communication status portion is loaded with information on a communication status, such as the number of communication errors detected by the network control section of the display device 2.

Figure 11:
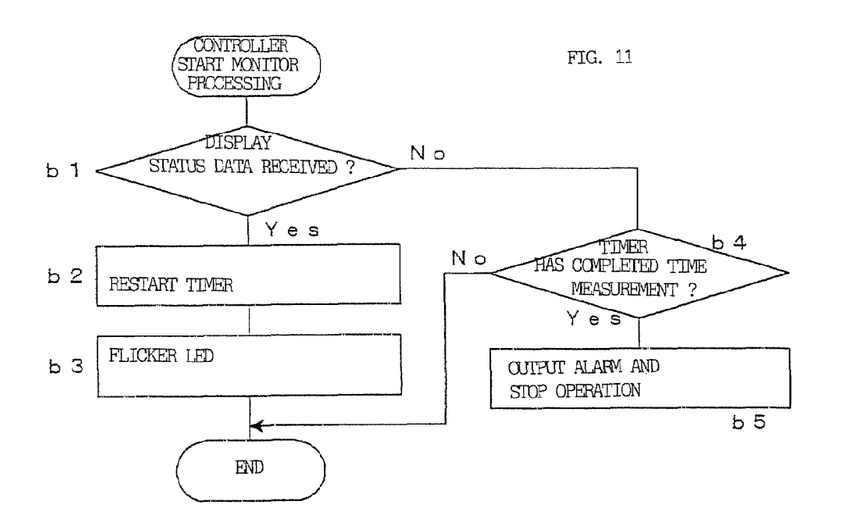
FIG. 11 is a flowchart showing start monitor processing executed by the controller of FIG. 1.

The processor 101 of each numerical controller 1 executes start monitor processing of FIG. 11 for monitoring the display status data, for each given period.

First, whether or not the display status data is received is determined (Step b1). If the data is not received, it is determined whether a preset time period has expired or not (Step b4). If the preset time period had not yet expired, the processing for the present period is finished. This timer is set so as to measure a time period a little longer than each of the time intervals at which the status data are delivered. When the display status data is received, the timer is reset to start time measurement (Step b2), and an LED on the numerical controller 1 is flickered (Step b3), whereupon the processing for the present period is finished. Indication of an indicator may be changed instead of flickering the LED. The flickering of the LED or the indication of the indicator can inform the numerical controller 1 of normal communication with the display device 2.

If the numerical controller 1 ceases to be able to receive the display status data after expiring of the preset time period in Step b4, moreover, it is concluded that the network 3 or the display device 2 is abnormal. Thereupon, a warning is outputted, and processing such as stopping of the operation of the numerical controller 1 is performed (Step b5).

The display status data from the display device 2 is not essential, and the numerical controller 1 can control the use of the display status data from the display device 2. Necessary/unnecessary flag data for the display status data from the display device 2 is set in advance in the status data periodically delivered from the numerical controller 1. Thereupon, the processor 201 of the display device 2 can check this flag so that the display status data is periodically transmitted only when it is "necessary." When the display status data from the display device 2 is supposed to be "necessary," the numerical controller 1 stays in the initialization mode without proceeding to the normal action mode unless it can receive the display status data from the display device 2 during the execution of the initializer program. If the display status data ceases to be able to be received in the normal action mode, processing such as machine security is performed.

When the display status data from the display device 2 is supposed to be "unnecessary", on the other hand, the numerical controller 1 can singly complete the initialization mode and start automatic machine operation in the normal action mode without the connection of the display device 2. If needed, in this case, the numerical controller 1 can be network-connected afterward with the display device 2.

The display screen on the display device 2 can be switched by inputting a command for selecting the numerical controller 1. This command input can be performed by using the keyboard of the input control section 206 or by clicking the display on the display section 205 corresponding to each numerical controller with the mouse. When the numerical controller 1 is selected, its display data is displayed on the display screen on the display device 2.

Figure 12:
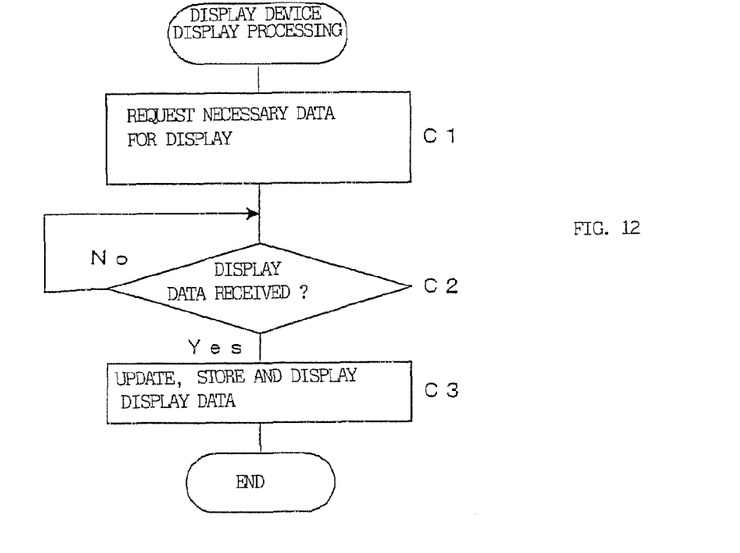
FIG. 12 is a flowchart showing display processing executed by the display device of FIG. 1.

When the command for selecting the numerical controller 1 is inputted, the processor 201 of the display device 2 executes display processing of FIG. 12 for each given period, based on the started display control program, among the other display control programs corresponding to the selected numerical controller 1, including the display control programs for initialization, normal action, and alarm processing.

A data request command for requiring necessary data for display is transmitted to the corresponding numerical controller 1 in accordance with the network control program (Step C1). Then, the display data returned from the numerical controller is received, stored, and displayed on the display screen (Steps C2 and C3). While the numerical controller 1 and its corresponding display screen are selected, thereafter, the processing shown in FIG. 12 is periodically executed, whereupon the display screen is updated.

Figure 13:
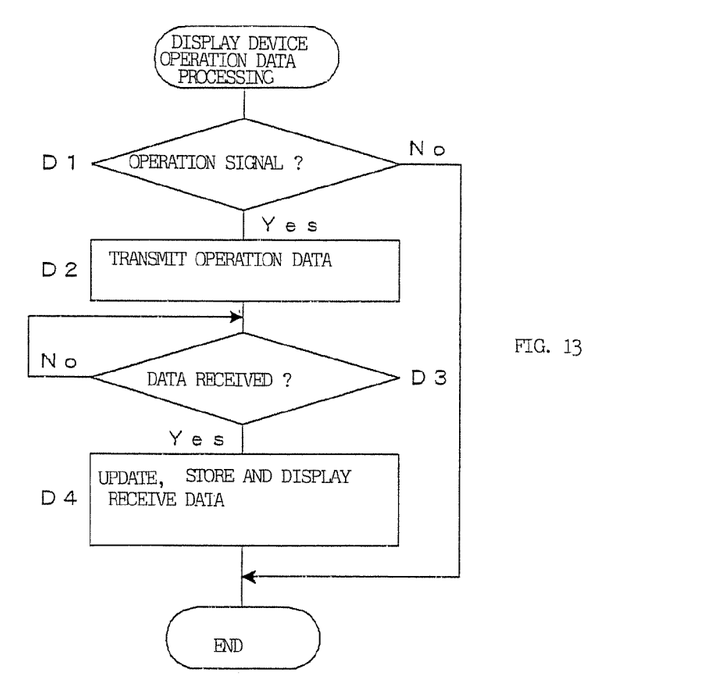
FIG. 13 is a flowchart showing operation data transmission processing executed by the display device of FIG. 1 executes.

When the display screen of the selected numerical controller 1 is thus displayed on the screen of the display section 205, the processor 201 executes processing of FIG. 13 for each given period. If the operator operates the keyboard or the like to make a request to the numerical controller 1, an operation signal is detected (Step D1), and its operation data is transmitted to the corresponding numerical controller (Step D2). Then, the receive data delivered from the numerical controller 1 is received (Step D3). If the display data is sent together with the receive data, it is updated, stored, and displayed (Step D4), whereupon the processing for the present period is finished.

Figure 14:
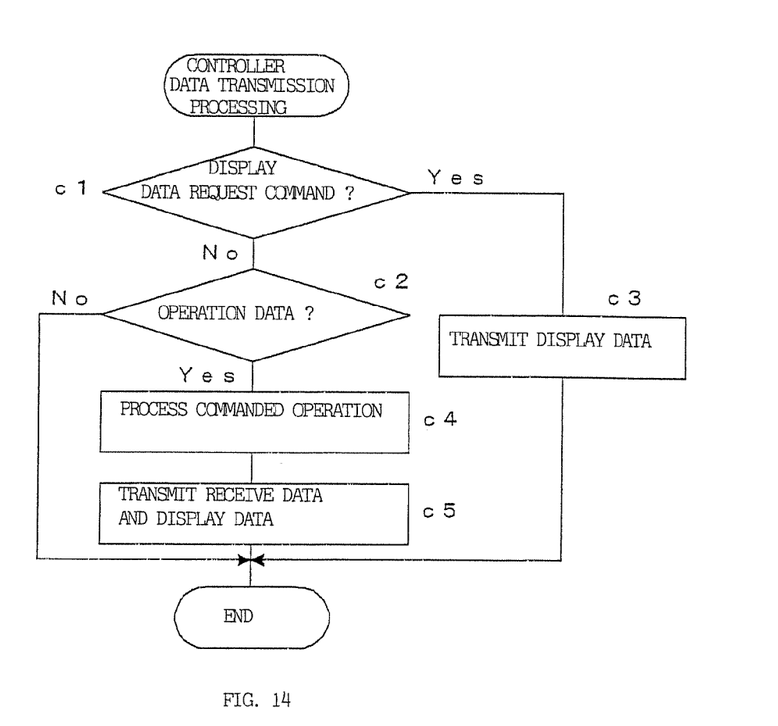
FIG. 14 is a flowchart showing data transmission processing executed by the controller of FIG. 1.

On the other hand, the processor 101 of the numerical controller 1 executes data transmission processing of FIG. 14 for each given period according to the program in execution, out of the system programs (initializer program, normal action part program, and alarm processor program) of the numerical controller.

First, it is determined whether or not the display data request command or operation data is received from the display device 2 (Steps c1 and c2). If neither the command nor the data is received, the processing for the present period is finished. If the display data request command is received, on the other hand, requested display data is transmitted (Step c3). If the operation data is received, processing corresponding to the commanded operation is executed (Step c4), and the receive data is transmitted or the receive data and the display data are transmitted together (Step c5).

Since the display device 2 can be simultaneously connected to a plurality of numerical controllers 1 through the network 3, a plurality of display screens can be displayed simultaneously. Since the display device 2 is provided with the display control programs for initialization, normal action, and alarm processing for each numerical controller, in particular, the display screens for the plurality of numerical controllers can be displayed with ease.

Figure 15:
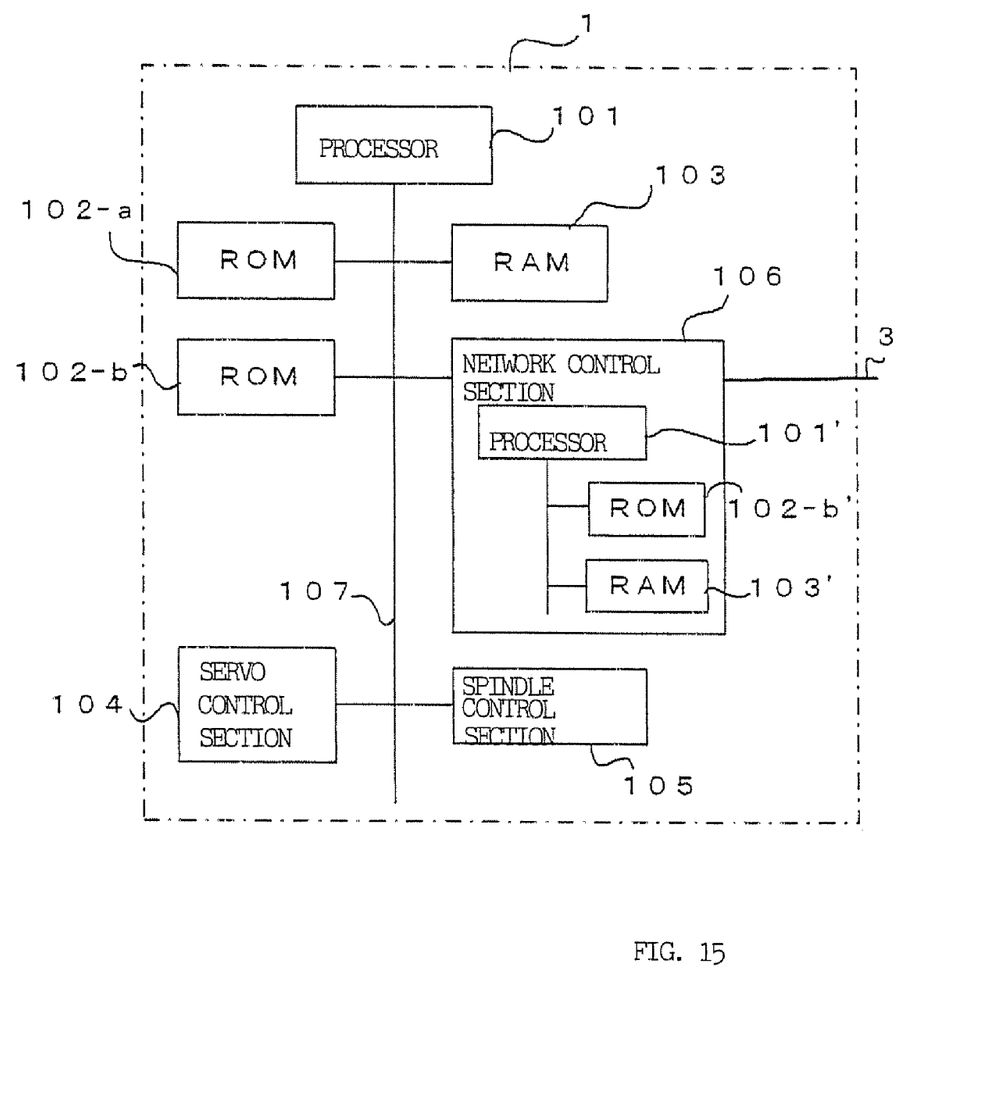
FIG. 15 is a block diagram showing an outline of a controller of a type different from the numerical controller of FIG. 2 constituting the display system of FIG. 1.

FIG. 15 is a diagram schematically showing a hardware configuration of another embodiment of the numerical controller that is applied to a display system for the controller according to the present invention. In this embodiment, a network control section 106 is provided with a processor 101' that performs a communication function. An alarm processor program of the numerical controller 1 is loaded into a flash ROM 102-b' that is separate from the flash ROM 102-b, and a RAM 103' is provided independently of the RAM 103 so that the normal action part program and the alarm processor program can be run in different hardwares.

The alarm processor program is loaded into the second flash ROM 102-b', which is separate from the flash ROM 102-b, and is executed by the processor 101' for the communication function. If the operation of the normal action part program is subject to any problem attributable to the processor 101 or the RAM 103, therefore, the respective statuses of the processor 101 and the RAM 103 of the numerical controller 1 can be examined more securely without being influenced by the problem.

In the systems of the embodiments described above, one display device 2 and a plurality of controllers 1 are connected to the network 3. Alternatively, however, a system may be configured so that one display device 2 and one controller 1 may be connected to the network 3. Further, the system may be provided with a plurality of display devices such that the screen of the controller 1 is displayed on the display devices or on one display device for each operation mode.

According to the foregoing embodiments, moreover, the display control programs for initialization, programs for normal action, and programs for alarm processing are as many as the numerical controllers 1 that are connected to the network 3. Alternatively, however, only one display control program for each purpose may be provided for all the numerical controllers. In this case, each numerical controller 1 is previously registered for the display control program corresponding to its operation mode, based on the status data delivered from the numerical controller 1. Each display control program periodically transmits display status data to the registered controller 1. When the controller 1 is called on the display screen of the display section 205, furthermore, the display control program for which the controller 1 is registered sends a display data request to the corresponding controller 1. Then, the display data delivered from the display device 2 is displayed on the display screen. When operation is performed on the display screen, the operation data is transmitted to the corresponding controller 1.

What is claimed is:

1. A display system, comprising:
a controller storing, as system programs, an initializer program, a normal action part program, and an alarm processor program; and
a display device connected to the controller by a network storing, as system programs, a display control program for initialization, a display control program for normal action, and a display control program for alarm processing, each said display control program including a network control program communicating with the controller and corresponding respectively to the initializer program, the normal action part program, and the alarm processor program of the controller,
wherein each said program of the controller including a network control program controlling a network control section to communicate with the display device, and
wherein various data are transmitted to the display device connected to the controller by the network through the network control section and display data is displayed on the display device when any one of the system programs of the controller is operational.

2. The display system for a controller according to claim 1, wherein
the various data include operation mode information for the controller, and
the display device is configured to start a display screen to display the display data thereon in accordance with the operation mode information.

3. The display system for a controller according to claim 2, wherein the display device is configured to execute said display control programs in accordance with said operation mode information from the controller and to display each corresponding display screen on a display section.

4. The display system for a controller according to claim 2, wherein the display device is configured to display a warning on the display screen when no operation mode information can be received from the controller.

5. The display system for a controller according to claim 1, wherein
the display device has transmission means configured to transmit operation mode information for the display device, which indicates to the controller that a display control program corresponding to an operation mode of the controller is running, and
the controller has display means for displaying reception of the information from the display device transmission means.

6. The display system for a controller according to claim 5, wherein the controller has stop means configured to stop the controller when operation mode information from the display device ceases to be able to be received.

7. The display system for a controller according to claim 1, wherein
two or more controllers and one display device are connected to the network, and
the display device is configured to display the display data of the controllers simultaneously or after changing a display screen.

8. The display system for a controller according to claim 1, which further comprises a communication processor for controlling a communication function, as well as a processor for controlling an operation mode of the controller.

* * * * *